United States Patent
Wang et al.

(10) Patent No.: US 12,409,442 B2
(45) Date of Patent: Sep. 9, 2025

(54) COMPOSITE MATERIAL FOR PHOTOCATALYTIC HYDROGEN PRODUCTION AND PHOTOCATALYTIC HYDROGEN PRODUCTION CATALYST

(71) Applicant: National Tsing Hua University, Hsinchu (TW)

(72) Inventors: Zan-Xiang Wang, Hsinchu (TW); Li-Yu Ting, Hsinchu (TW); Ho-Hsiu Chou, Hsinchu (TW); Tsan-Yao Chen, Hsinchu (TW); Fan-Gang Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1101 days.

(21) Appl. No.: 17/367,434

(22) Filed: Jul. 5, 2021

(65) Prior Publication Data
US 2022/0305462 A1    Sep. 29, 2022

(30) Foreign Application Priority Data
Mar. 24, 2021  (TW) ................................ 110110583

(51) Int. Cl.
| | | |
|---|---|---|
| *B01J 21/06* | (2006.01) | |
| *B01J 31/06* | (2006.01) | |
| *B01J 31/38* | (2006.01) | |
| *B01J 35/33* | (2024.01) | |
| *B01J 35/39* | (2024.01) | |

(Continued)

(52) U.S. Cl.
CPC .............. *B01J 21/063* (2013.01); *B01J 31/06* (2013.01); *B01J 31/38* (2013.01); *B01J 35/33* (2024.01); *B01J 35/39* (2024.01); *B01J 37/04* (2013.01); *B01J 37/343* (2013.01); *C01B 3/042* (2013.01)

(58) Field of Classification Search
None
See application file for complete search history.

(56) References Cited

U.S. PATENT DOCUMENTS

2020/0378018 A1* 12/2020  He ..................... B82Y 40/00

FOREIGN PATENT DOCUMENTS

| CN | 101234344 | 8/2008 |
|---|---|---|
| CN | 108927226 A * | 12/2018 |

(Continued)

OTHER PUBLICATIONS

CN 107051591 A (Year: 2017).*

(Continued)

*Primary Examiner* — Joseph D Anthony
(74) *Attorney, Agent, or Firm* — JCIPRNET (57) ABSTRACT

A composite material for photocatalytic hydrogen production and a photocatalytic hydrogen production catalyst are provided. The composite material includes a plurality of inorganic semiconductor particles and a linear conjugated polymer material. The conductive band of a material of the inorganic semiconductor particles is higher than the reduction potential of hydrogen, and the linear conjugated polymer material is compounded on a surface of each of the inorganic semiconductor particles, wherein the difference in the energy level of the lowest unoccupied molecular orbital (LUMO) of the linear conjugated polymer material and the conductive band of the material of the inorganic semiconductor particles is within 2 eV.

5 Claims, 8 Drawing Sheets

(51) Int. Cl.
  *B01J 37/04* (2006.01)
  *B01J 37/34* (2006.01)
  *C01B 3/04* (2006.01)

(56) References Cited

FOREIGN PATENT DOCUMENTS

| | | |
|---|---|---|
| CN | 110280306 | 9/2019 |
| WO | 2014169373 | 10/2014 |

OTHER PUBLICATIONS

Jayachandran Jayakumar, et al., "Recent Advances in Visible-Light-Driven Hydrogen Evolution from Water using Polymer Photocatalysts", ChemCatChem, Dec. 2, 2019, pp. 1-18, Available at: http://dx.doi.org/10.1002/cctc.201901725.

Li-Yu Ting, et al., "Effect of controlling the number of fused rings on polymer photocatalysts for visible-light-driven hydrogen evolution", Journal of Materials Chemistry A, Aug. 14, 2019, pp. 1-19.

Rongliang Qiu, et al., "Characterization of Conjugated Polymer Poly(fluorene-co-thiophene) and Its Application as Photosensitizer of TiO2", International Journal of Photoenergy, Apr. 15, 2007, pp. 1-5.

\* cited by examiner

COMPOSITE MATERIAL FOR PHOTOCATALYTIC HYDROGEN PRODUCTION AND PHOTOCATALYTIC HYDROGEN PRODUCTION CATALYST

CROSS-REFERENCE TO RELATED APPLICATION

This application claims the priority benefit of Taiwan application serial no. 110110583, filed on Mar. 24, 2021. The entirety of the above-mentioned patent application is hereby incorporated by reference herein and made a part of this specification.

BACKGROUND

Technical Field

The disclosure relates to a technique for hydrogen production and, in particular, to a composite material for photocatalytic hydrogen production and a photocatalytic hydrogen production catalyst.

Description of Related Art

Among numerous alternatives to fossil fuel energy, hydrogen energy is considered one of the promising green energy sources. There are many methods of hydrogen production, among which photocatalytic hydrogen production only consumes solar power without using extra energy and causing carbon dioxide emission and production.

Despite research on hydrogen energy conducted by industries and academics, most inorganic photocatalysts (inorganic semiconductor materials) are far from ideal because the ranges of the energy gaps of these inorganic photocatalysts are too large. With these inorganic photocatalysts, only ultraviolet accounting for merely 4%-5% of the solar spectrum can be used while visible light accounting for 40% of the solar spectrum is used far less. In addition, most inorganic photocatalysts can be affected by photo-corrosion, which decreases the lifespan of these inorganic materials.

In recent years, there is some research centering on linear conjugated polymer materials. Because of the adjustable structures of linear conjugated polymers, visible light may be absorbed by adjusting the structures of linear conjugated polymers. However, currently, how to effectively improve the efficiency of hydrogen production of linear conjugated polymer materials is still an issue to be researched and developed. In particular, linear conjugated polymer materials tend to agglomerate at a high concentration while to be penetrated by light at a low concentration, which compromises the efficiency when using linear conjugated polymer materials.

Therefore, developing an appropriate photocatalytic system to increase the efficiency while working on the above issues is important.

SUMMARY

Accordingly, the disclosure is directed to a composite material for photocatalytic hydrogen production, which absorbs visible light, reduces agglomeration of materials, and facilitates convergence of light.

The disclosure is also directed to a photocatalytic hydrogen production catalyst, which facilitates the efficiency of hydrogen production.

A composite material for photocatalytic hydrogen production in this disclosure includes a plurality of inorganic semiconductor particles and a linear conjugated polymer material. A conduction band of a material of the inorganic semiconductor particles is higher than a reduction potential of hydrogen, and the linear conjugated polymer material is compounded on a surface of each of the inorganic semiconductor particles. An energy level difference between a lowest unoccupied molecular orbital (LUMO) of the linear conjugated polymer material and the conductive band of the material of the inorganic semiconductor particles is within 2 eV.

In an embodiment of the disclosure, an energy gap range of the linear conjugated polymer material is, for example, between 0.5 eV and 3.5 eV, and a potential of the lowest unoccupied molecular orbital of the linear conjugated polymer material is more negative than the reduction potential of hydrogen.

In an embodiment of this disclosure, based on a total weight of the above-mentioned composite material, a content of the linear conjugated polymer material is, for example, from 0.001 wt % to 99.99 wt %.

In an embodiment of this disclosure, an average hydrodynamic diameter of the composite material measured based on dynamic light scattering (DLS) is between 2 nm and 10000 nm.

A photocatalytic hydrogen production catalyst in this disclosure includes the composite material for photocatalytic hydrogen production.

In another embodiment of this disclosure, the photocatalytic hydrogen production catalyst may also include a hydrogen-producing solvent.

In another embodiment of this disclosure, a recombination rate of photo-excited electrons of the photocatalytic hydrogen production catalyst is lower than a recombination rate of photo-excited electrons of the hydrogen producing solution obtained by mixing the inorganic semiconductor particles and the linear conjugated polymer material.

In light of the above, according to the disclosure, the agglomeration of the conjugated polymer material in a solution is reduced by making the linear conjugated polymer material compounded to the outside of each of the inorganic semiconductor particles. In addition, since the energy levels of the material of the inorganic semiconductor particles and the lowest unoccupied molecular orbital (LUMO) of the linear conjugated polymer material are close, a photo-excited electron may move from the LUMO of the linear conjugated polymer material to the conduction band of the material of the inorganic semiconductor particles after the carrier of the linear conjugated polymer material is separated through light excitation. Thus, the survival time of the photo-excited electron is prolonged, and rapid recombination is avoided. As a result, the efficiency of photocatalytic hydrogen production is facilitated.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present embodiments of the disclosure, examples of which are illustrated in the accompanying drawings. However, the disclosure may also be implemented in various forms and shall not be interpreted as being limited to the embodiments described in the following. In the drawings, to provide a clear understanding, each combination and particle are represented in a schematic view, rather than actual sizes. Wherever possible, the same reference numbers are used in the drawings and the description to refer to the same or like parts.

Figure 1:
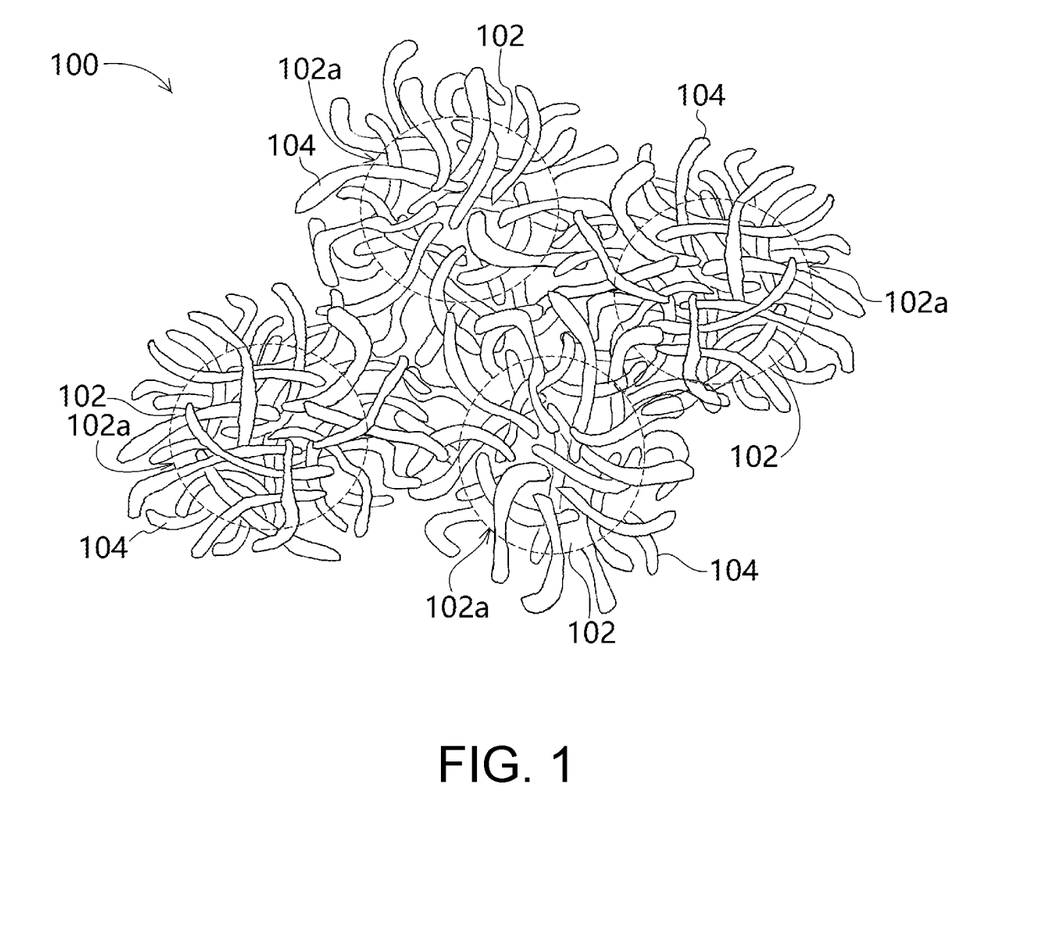
FIG. 1 is a schematic view of a composite material for photocatalytic hydrogen production according to an embodiment of the disclosure.

FIG. 1 is a schematic view of a composite material for photocatalytic hydrogen production according to an embodiment of the disclosure.

Referring to FIG. 1, a composite material 100 for photocatalytic hydrogen production in the embodiment includes a plurality of inorganic semiconductor particles 102 and a linear conjugated polymer material 104. The conduction band of the material of the inorganic semiconductor particles 102 is higher than the reduction potential of hydrogen. Accordingly, through irradiation, an electron jumps from the valence band to the conduction band and becomes a photo-excited electron. Hydrogen is thus produced through a reduction reaction of the photo-excited electron with water ($H_2O$). The linear conjugated polymer material 104 is compounded on a surface 102a of each of the inorganic semiconductor particles 102, and the linear conjugated polymer material 104 is connected to the surface 102a of the inorganic semiconductor particle 102 through, for example, a force except for a covalent bond and/ or a metallic bond. In addition, the energy level difference between the lowest unoccupied molecular orbital (LUMO) of the linear conjugated polymer material 104 and the conduction band of the material of the inorganic semiconductor particles 102 is within 2 eV. Due to the difference in the energy gaps of the materials, a carrier of the linear conjugated polymer material 104 is separated through light excitation, and a photo-excited electron moves from LUMO to the conduction band of the material of the inorganic semiconductor particles 102, which prolongs the survival time of the photo-excited electron and avoids rapid recombination. As a result, the efficiency of photocatalytic hydrogen production is effectively improved. Furthermore, the average hydrodynamic diameter of the composite material 100 measured based on dynamic light scattering (DLS) is, for example, between 2 nm and 10000 nm. The smaller average hydrodynamic diameter represents better dispersion and less agglomeration of powder. As a result, in the embodiment, the composite material 100 is capable of reducing agglomeration in the traditional photocatalyst.

In an embodiment, the energy gap range of the linear conjugated polymer material 104 is, for example, between 0.5 eV and 3.5 eV, and the LUMO potential of the linear conjugated polymer material 104 is more negative than the reduction potential of hydrogen. Accordingly, examples of the linear conjugated polymer material 104 may include PF3T, PF2T, PFT, PIFT, PIF2T, PIF3T, PFBOT, BFB, PANI, P7, PySO, P7-E, PyPm, P28, PTh, L-PyBT, PMTPA-250, OCP-3, P64, OT-16, and B-FBT-1, 4-E (For the structures of the above examples, refer to the following: *Recent Advances in Visible-Light-Driven Hydrogen Evolution from Water using Polymer Photocatalysts*, DOI: 10.1002/cctc.201901725); however, the disclosure is not limited thereto, and other appropriate linear conjugated polymers may also be used as the linear conjugated polymer material 104. In an embodiment, examples of the material of the inorganic semiconductor particles 102 may include $TiO_2$, ZnO, $ZrO_2$, $KTaO_3$, $SrTiO_3$, $Cu_2O$, GaP, ZnS, CdS, SiC; however, the disclosure is not limited thereto, and other appropriate inorganic semiconductors may also be used as the material of the inorganic semiconductor particles 102.

Referring to FIG. 1 again, a preparation example of the composite material 100 in the embodiment includes, for example, as follows. The inorganic semiconductor particles 102 and the linear conjugated polymer material 104 were, respectively, dispersed with a solvent. The dispersion liquid of the linear conjugated polymer material 104 was added dropwise to the dispersion liquid of the inorganic semiconductor particles 102, and, subsequently, ultrasonic oscillation, stirring, cleaning, centrifugal dewatering, and drying were conducted. An anti-solvent may be adopted as the solvent of the inorganic semiconductor particles 102. For example, when $TiO_2$ is used as the inorganic semiconductor particles 102, methanol (MeOH) may be used as the solvent to facilitate the precipitation of the linear conjugated polymer material 104 on the surface 102a of the inorganic semiconductor particles 102; however, the disclosure is not limited thereto. In another embodiment, other conventional solvents for dispersion may also be used as the solvent of the inorganic semiconductor particles 102.

In an embodiment, based on the total weight of the composite material 100, the content of the linear conjugated polymer material 104 is, for example, from 0.001 wt % to 99.99 wt %. Adding a slight or a large amount of the linear conjugated polymer material 104 are both effective, while adding a small amount of the linear conjugated polymer material 104 yields better hydrogen production performance. The number of "wt %" described herein is obtained by dividing the difference in the weight of the dry powder before and after a high-temperature process (to remove the linear conjugated polymer material 104) by the weight of the dry powder of the composite material 100.

A photocatalytic hydrogen production catalyst in another embodiment of the disclosure includes the composite material 100 for photocatalytic hydrogen production. In the embodiment, the photocatalytic hydrogen production catalyst may also include a hydrogen-producing solvent, and examples of the hydrogen-producing solvent may include, but not limited to, at least one solvent selected from a group consisting of methanol, deionized water, triethylamine, vitamin C, ethanol, and triethanolamine.

Furthermore, an analysis of time-resolved photoluminescence (TRPL) indicates that the recombination rate of the photo-excited electrons of the photocatalytic hydrogen production catalyst containing the composite material 100 is lower than the recombination rate of the photo-excited electrons of the hydrogen producing solution obtained by only mixing the inorganic semiconductor particles and the linear conjugated polymer material.

Experiments will be described in the following to verify the effects of the disclosure; however, the disclosure is not limited to the contents described in the following.

PREPARATION EXAMPLE 1

Inorganic semiconductor particles: commercialized $TiO_2$ powder (manufactured by Degussa)
Linear conjugated polymer material: laboratory-made PF3T
Solvent: Tetrahydrofuran (THF) (manufactured by MACRON)
Solution S1 was prepared by mixing 5 mg of $TiO_2$ powder and 5 ml of THF. Solution S2 was prepared by mixing 0.25 mg of PF3T and 5 ml of THF. Next, a mixture solution was obtained by adding Solution S2 dropwise to Solution S1 and conducting ultrasonic oscillation. Next, powder of a composite material of Preparation Example 1 was obtained by stirring the mixture solution at 700 rpm at room temperature (26° C.) for 16 hours and, subsequently, conducting cleaning, centrifugal dewatering, and drying (60° C.).

PREPARATION EXAMPLES 2-4

Powder of composite materials of Preparation Examples 2-4 is obtained in the same manner as Preparation Example 1, except that the solvent of Solution S2 was changed to methanol (MeOH), and the amount of PF3T added was set to 0.0625 mg, 0.125 mg, and 0.25 mg, respectively.

COMPARATIVE PREPARATION EXAMPLE 1

5 mg of PF3T was directly used.

COMPARATIVE PREPARATION EXAMPLE 2

5 mg of $TiO_2$ powder was directly used.

COMPARATIVE PREPARATION EXAMPLE 3

1 mg of $TiO_2$ powder and 5 mg PF3T were directly used.
Average Hydrodynamic Diameter
5 mg of the powder of Preparation Examples 1-4 was, respectively, suspended in 10 ml of a hydrogen-producing solvent (methanol:deionized water:trimethylamine=1:1:1) (i.e., the solvent to test the amount of hydrogen production). The liquid obtained was put in a cuvette and the hydrodynamic diameters were measured with a particle size analyzer. The results are shown in FIG. 2.

Similarly, the materials of Comparative Preparation Examples 1-3 were, respectively, suspended in 10 ml of the hydrogen-producing solvent. The liquid obtained in Comparative Preparation Examples 1-3 was put in a cuvette and the hydrodynamic diameters were measured with a particle size analyzer. The results are also shown in FIG. 2.

Figure 2:
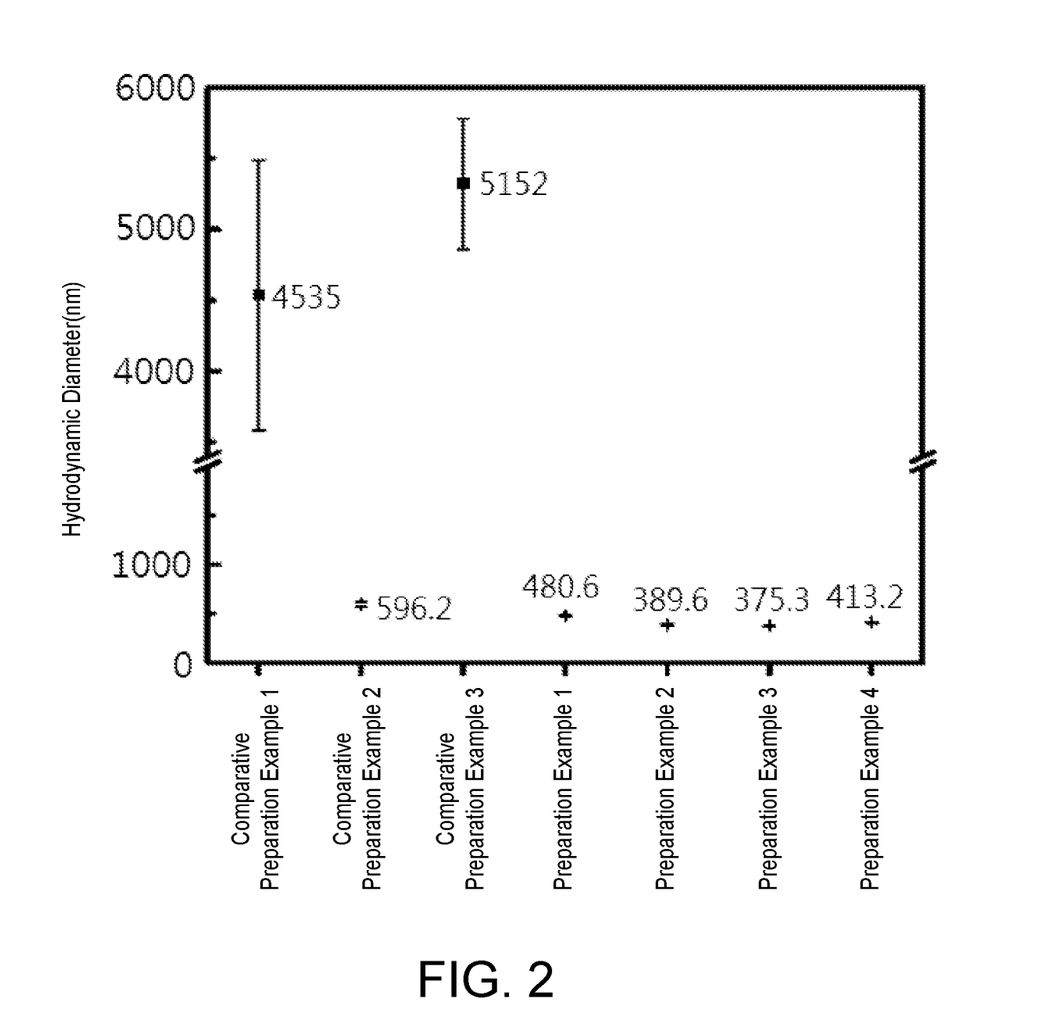
FIG. 2 is a diagram of the average hydrodynamic diameters of Comparative Preparation Examples 1-3 and Preparation Examples 1-4.

As shown in FIG. 2, the average hydrodynamic diameters measured in Comparative Preparation Examples 1-3 are obviously larger than the average hydrodynamic diameters measured in Preparation Examples 1-4, which indicates that obvious agglomeration is shown in Comparative Preparation Examples 1-3. On the other hand, great dispersion is shown in Preparation Examples 1-4. As a result, the powder of Preparation Examples 1-4 tends not to agglomerate and the average hydrodynamic diameters measured are smaller.

In addition, through observation by SEM, the structures of the materials of Comparative Preparation Examples 1-3 are found to contain polymer blocks. A large amount of $TiO_2$ is embedded in the polymer blocks, so the surface area where the material contacts water is expected to decrease, which reduces the efficiency of photocatalysis.

Figure 3A:
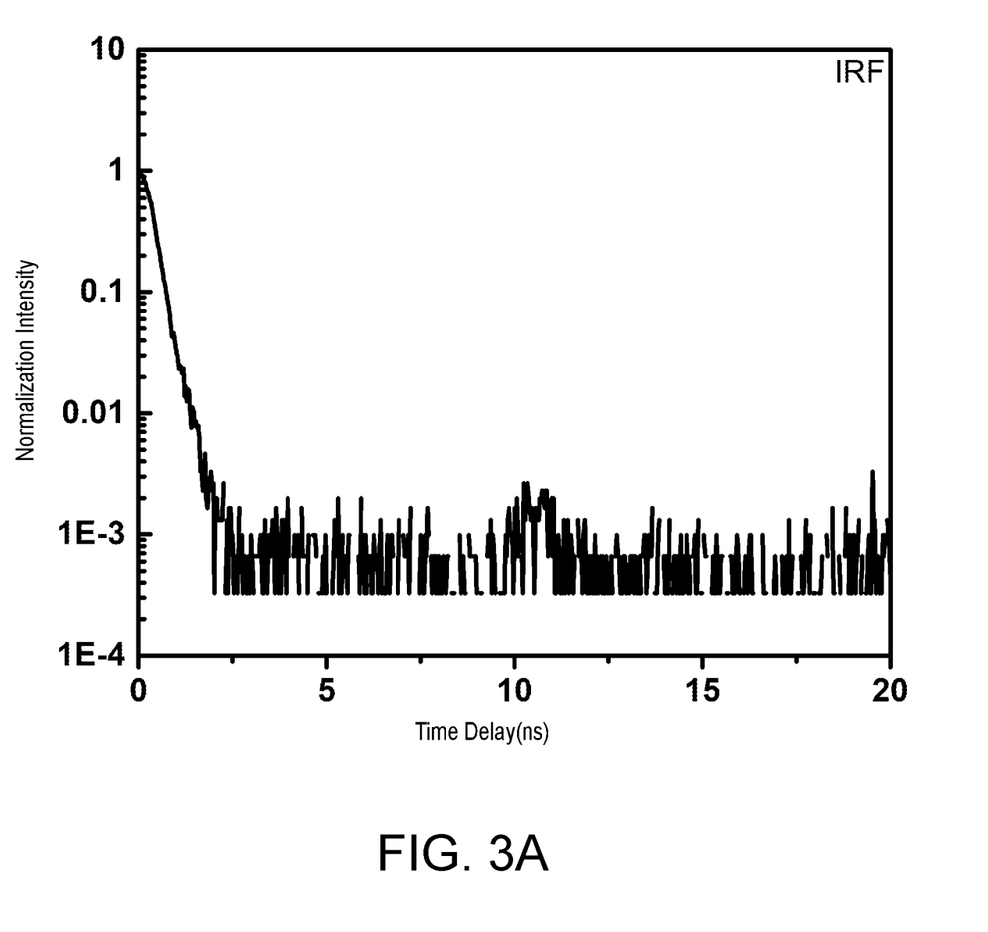
FIG. 3A is a diagram of time-resolved photoluminescence of instrument response function (IRF).

Also, the average hydrodynamic diameters measured in Preparation Examples 2-4 are smaller than the average hydrodynamic diameter measured in Preparation Example 1. The reason may be that the solvent of Preparation Examples 2-4 is capable of further improving suspension of a catalyst and making the particle size of the powder prepared smaller.
Analysis of Time-Resolved Photoluminescence (TRPL)
FIG. 3A is a diagram of time-resolved photoluminescence of instrument response function (IRF).

Figure 3B:
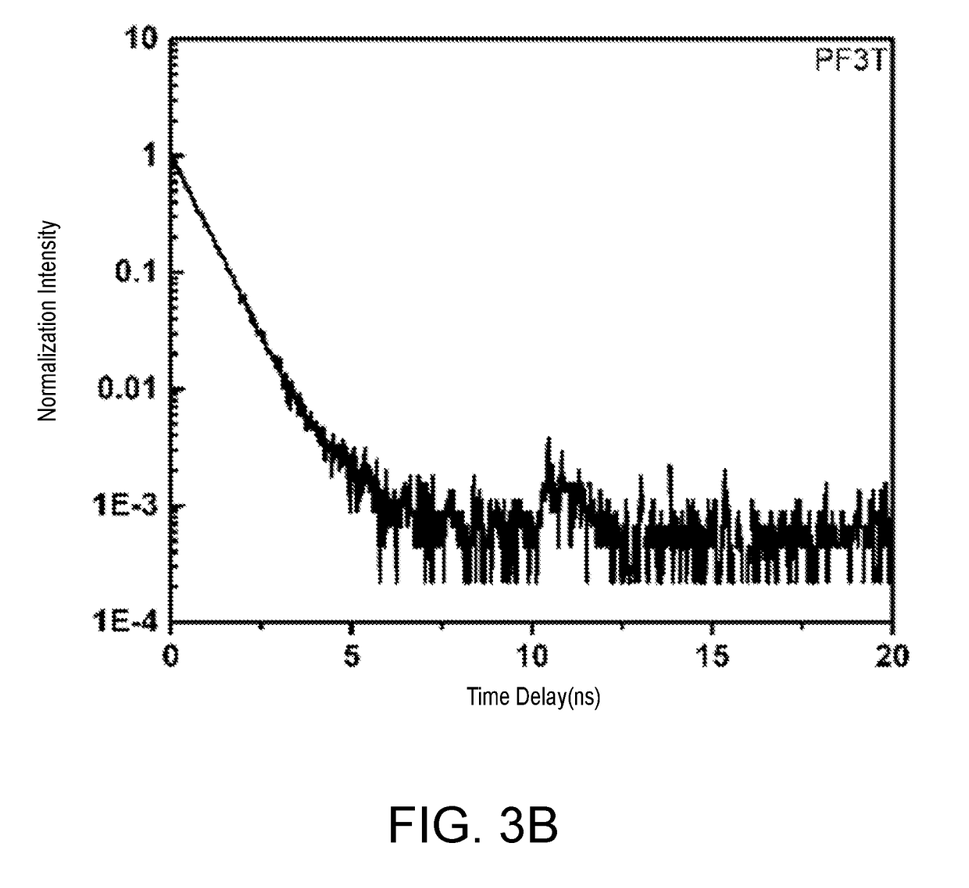
FIG. 3B is a diagram of time-resolved photoluminescence of PF3T used in Comparative Preparation Example 1.

PF3T of Comparative Preparation Example 1 was dissolved in 10 ml of THF, and a test was conducted to obtain a diagram of time-resolved photoluminescence as shown in FIG. 3B.

Figure 3C:
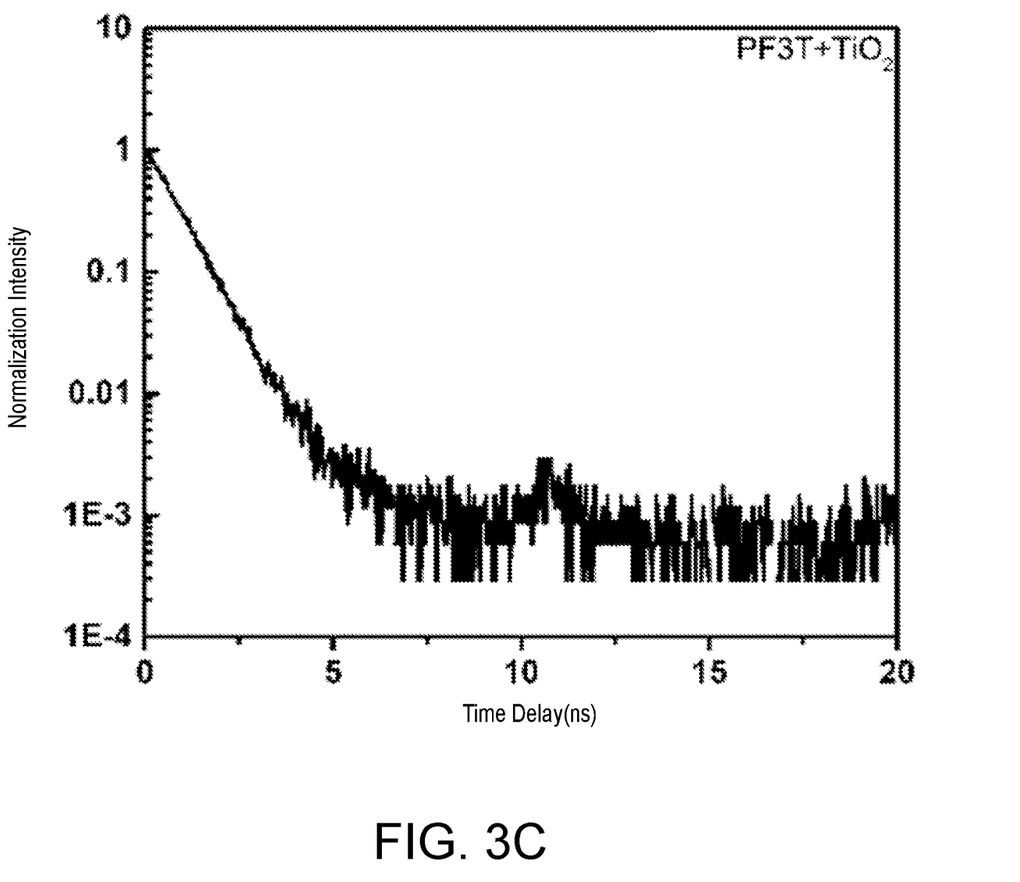
FIG. 3C is a diagram of time-resolved photoluminescence of Comparative Preparation Example 3.

The materials of Comparative Preparation Example 3 was suspended in 10 ml of ethanol, and a test was conducted to obtain a diagram of time-resolved photoluminescence as shown in FIG. 3C.

Figure 3D:
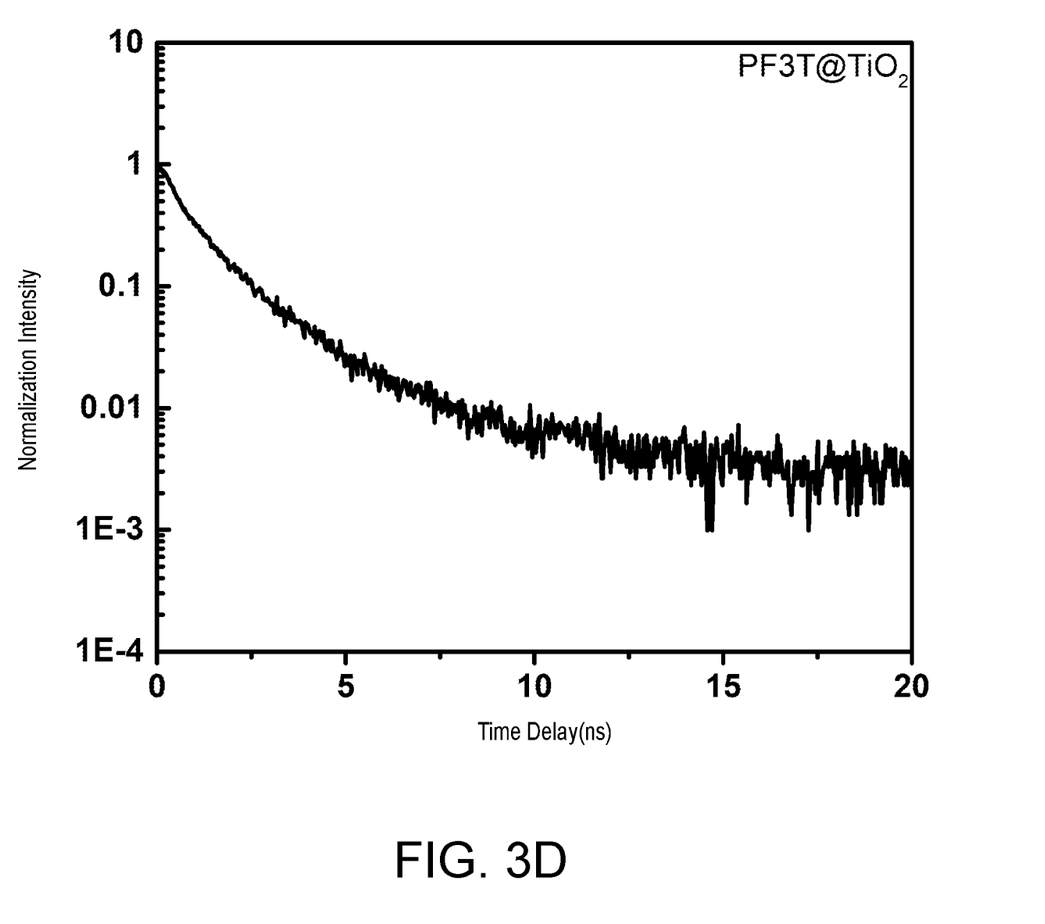
FIG. 3D is a diagram of time-resolved photoluminescence of Preparation Example 4.

The composite material of Preparation Example 4 was suspended in 10 ml of ethanol, and a test was conducted to obtain a diagram of time-resolved photoluminescence as shown in FIG. 3D.

As shown in FIGS. 3B to 3D, the spectral decay shown in FIG. 3D is more modest than the spectral decay shown in FIGS. 3B and 3C. The results indicate that the light emission speed of the composite material used in Preparation Example 4 decreases and electron transfer happens on the interface of the materials, which prolongs the survival time of a photo-excited electron and avoids rapid recombination.

EXPERIMENTAL EXAMPLE 1

5 mg of the composite material powder of Preparation Example 1 was weighed and put in a reactor, and a total of 10 ml of trimethylamine, methanol, and water at the ratio of 1:1:1 was added. Next, ultrasonic oscillation was conducted for 3 minutes for dispersion.

Subsequently, argon was used in for aeration, and the reactor was connected with a water cooling equipment (to prevent the temperature of the reactor from increasing due to light irradiation). Also, a xenon light, a sunlight filter, and a 400 nm wavelength filter were used, and light with the intensity of 1000 $W/m^2$ was provided. 0.5 ml of the gas in was drawn per hour and analyzed, and the hydrogen evolution rate (HER) was obtained through back-calculation from a calibration curve. The results are shown in Table 1 below and FIG. 4.

Also, the composite material powder of Preparation Example 1 was used, in which high-temperature pyrolysis at 600° C. was conducted on PF3T used. Next, the (actual) weight of $TiO_2$ powder was obtained by weighing the remaining composite material powder. The (actual) weight of PF3T used was obtained from the weight difference of the composite material powder before and after the high-temperature process (to remove PF3T). The results are also shown in Table 1 below.

EXPERIMENTAL EXAMPLES 2-4

Figure 4:
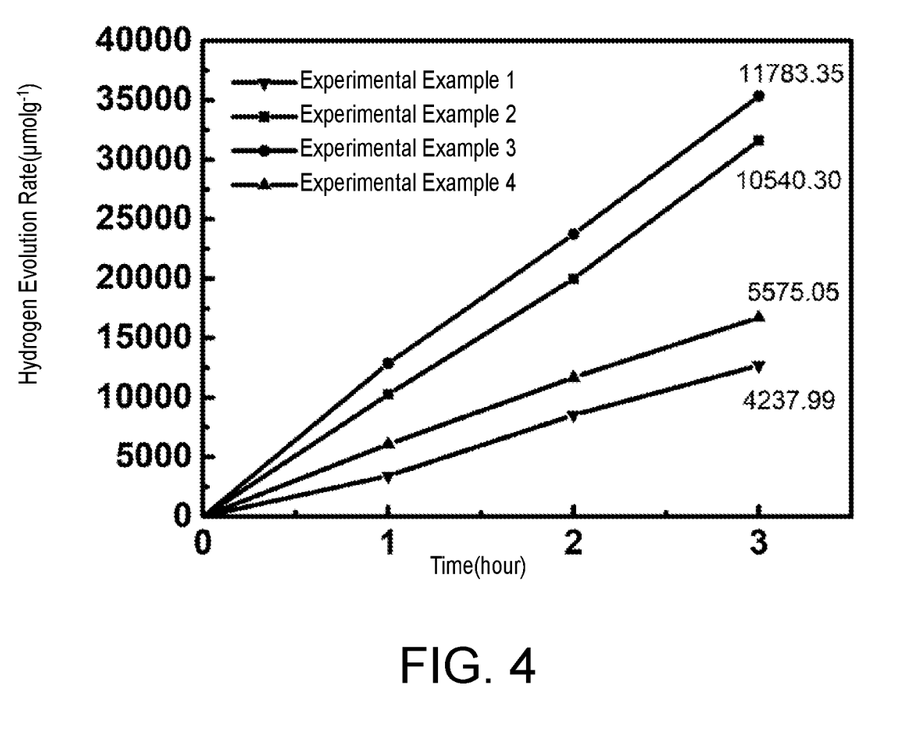
FIG. 4 is a curve chart of the hydrogen evolution rates (HER) of Experimental Examples 1-4.

The composite material powder in Preparation Examples 2-4 was tested in the same manner as in Experimental Example 1, and the results are also shown in Table 1 below and FIG. 4.

TABLE 1

|  | Weight of TiO$_2$ (mg) | Weight of PF3T (mg) | HER (μmol g$^{-1}$h$^{-1}$) |
| --- | --- | --- | --- |
| Experimental Example 1 | 4.9014 | 0.0985 | 4237.99 |
| Experimental Example 2 | 4.8861 | 0.1139 | 5575.05 |
| Experimental Example 3 | 4.9494 | 0.0506 | 11783.35 |
| Experimental Example 4 | 4.9781 | 0.0219 | 10540.30 |

As shown in Table 1, the proportion of the weight of PF3T is obviously lower than the proportion of the PF3T added. For example, 0.25 mg of PF3T was added in Preparation Example 4, while the weight of PF3T in the obtained composite material was 0.0219 mg. Therefore, the actual weight proportion of the linear conjugated polymer material of the disclosure is much lower than the amount added. As a result, the hydrogen evolution rate is increased mainly because the agglomeration of polymers is reduced and electrons transfer on the heterojunction.

COMPARATIVE EXAMPLES 1-3

The materials in Comparative Preparation Examples 1-3 were respectively tested in the same manner as in Experimental Example 1. The results of the hydrogen production rate for three hours are also shown in FIG. 5.

Figure 5:
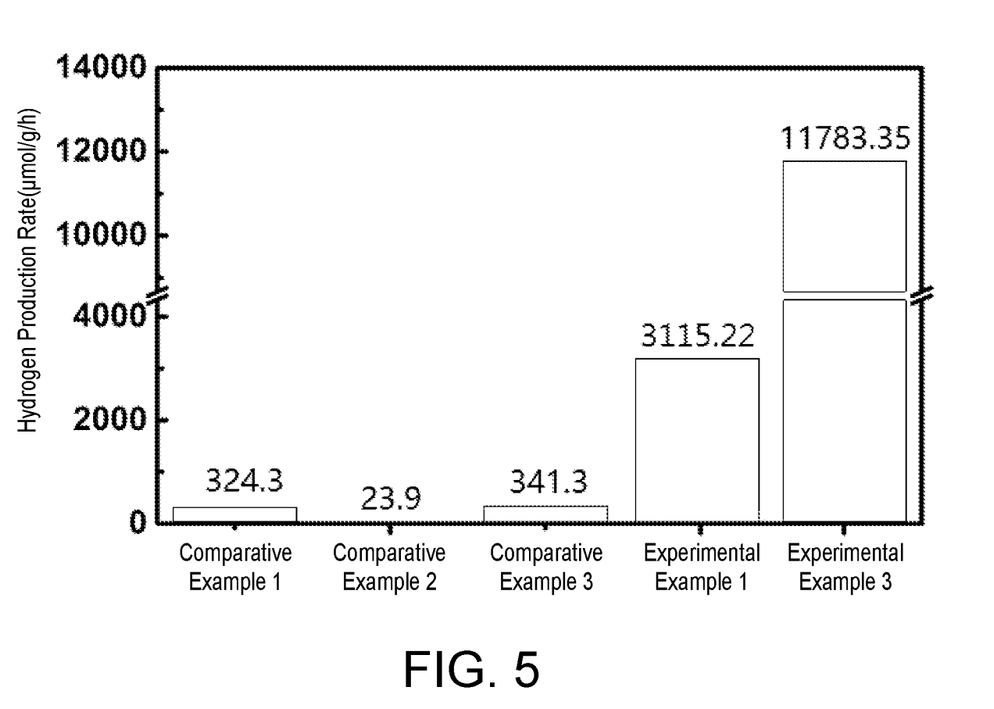
FIG. 5 is a bar graph of the hydrogen production rates of Experimental Example 1, Experimental Example 3, and Comparative Examples 1-3.

Also, the results of the hydrogen production rate of Experimental Examples 1 and 3 for three hours are shown in FIG. 5.

As shown in FIG. 5, the efficiency of photocatalytic hydrogen production when using the composite material of the disclosure is much greater than using an inorganic photocatalyst, a linear conjugated polymer material, or a mixture thereof in the conventional process.

In light of the above, the composite material of the disclosure is capable of reducing the agglomeration of the conjugated polymer material in a solution. In addition, since the energy levels of the lowest unoccupied molecular orbital (LUMO) of the linear conjugated polymer material and the material of the inorganic semiconductor particles are close, a photo-excited electron may transfer on an interface after the carrier of the linear conjugated polymer material is separated through light excitation. That is, the photo-excited electron moves from the LUMO of the linear conjugated polymer material to the conduction band of the material of the inorganic semiconductor particles. Thus, the survival time of the photo-excited electron is prolonged, and rapid recombination is avoided. As a result, the efficiency of photocatalytic hydrogen production is facilitated.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A composite material for photocatalytic hydrogen production, the composite material comprising:
    a plurality of inorganic semiconductor particles, wherein a conduction band of a material of the inorganic semiconductor particles is higher than a reduction potential of hydrogen; and
    a linear conjugated polymer material, compounded on a surface of each of the inorganic semiconductor particles, wherein an energy level difference between a lowest unoccupied molecular orbital (LUMO) of the linear conjugated polymer material and the conductive band of the material of the inorganic semiconductor particles is within 2 eV,
    wherein, based on the total weight of the composite material, the content of the linear conjugated polymer material is from 0.001 wt % to 1.012 wt %.

2. The composite material for photocatalytic hydrogen production according to claim 1, wherein an energy gap range of the linear conjugated polymer material is between 0.5 eV and 3.5 eV, and a potential of the lowest unoccupied molecular orbital of the linear conjugated polymer material is more negative than the reduction potential of hydrogen.

3. The composite material for photocatalytic hydrogen production according to claim 1, wherein an average hydrodynamic diameter of the composite material measured based on dynamic light scattering (DLS) is between 2 nm and 10000 nm.

4. A photocatalytic hydrogen production catalyst, comprising:
    the composite material for photocatalytic hydrogen production according to claim 1; and
    a hydrogen-producing solvent.

5. The photocatalytic hydrogen production catalyst according to claim 4, wherein a recombination rate of photo-excited electrons of the photocatalytic hydrogen production catalyst is lower than a recombination rate of photo-excited electrons of a hydrogen producing solution obtained by mixing the inorganic semiconductor particles and the linear conjugated polymer material.

* * * * *